United States Patent
Vu et al.

(10) Patent No.: US 7,735,000 B2
(45) Date of Patent: Jun. 8, 2010

(54) INFORMATION AND CONTENT EXCHANGE DOCUMENT TYPE DEFINITIONS TO SUPPORT CONTENT DISTRIBUTION

(75) Inventors: Quan Vu, Milpitas, CA (US); Xin Xue, San Jose, CA (US); Naoyuki Sato, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 898 days.

(21) Appl. No.: 10/673,020

(22) Filed: Sep. 25, 2003

(65) Prior Publication Data

US 2005/0071486 A1 Mar. 31, 2005

(51) Int. Cl.
*G06F 17/00* (2006.01)
*G06F 15/16* (2006.01)
*H04N 7/173* (2006.01)

(52) U.S. Cl. .................. 715/234; 715/235; 709/219

(58) Field of Classification Search ............ 709/230, 709/219, 203; 715/513, 234, 235; 725/86–87
See application file for complete search history.

(56) References Cited

U.S. PATENT DOCUMENTS

| 5,577,232 | A | 11/1996 | Priem et al. .............. 395/500 |
| 5,848,064 | A | 12/1998 | Cowan |
| 5,951,639 | A | 9/1999 | MacInnis ................ 709/217 |
| 6,031,830 | A | 2/2000 | Cowan ..................... 370/338 |
| 6,119,165 | A | 9/2000 | Li et al. .................... 709/229 |
| 6,226,744 | B1 | 5/2001 | Murphy et al. .......... 713/200 |
| 6,253,207 | B1 | 6/2001 | Malek et al. ............. 707/104 |
| 6,272,547 | B1 | 8/2001 | McWilliams ............ 709/232 |
| 6,308,061 | B1 | 10/2001 | Criss et al. ............... 455/418 |
| 6,341,316 | B1 | 1/2002 | Kloba et al. ............. 709/248 |
| 6,493,748 | B1 | 12/2002 | Nakayama et al. ...... 709/218 |

(Continued)

OTHER PUBLICATIONS

Howard P. Katseff et al. "Predictive Prefetch in the Nemesis Multimedia Information Service", AT&T Bell Laboratories, pp. 201-209.

(Continued)

*Primary Examiner*—Philip J Chea
(74) *Attorney, Agent, or Firm*—Haverstock & Owens LLP

(57) ABSTRACT

Extensions to a communications protocol manage the exchange of data content and related metadata according to a hierarchical data content structure. The communications protocol is the ICE protocol, and the extensions include ICE DTD extensions. Data content is preferably offered according to a subscription service provided by a first network device. The first network device is preferably a content server. The data content is organized, and thereby distributed, according to a hierarchical data content structure defined by the ICE DTD extensions. The hierarchical data content structure provides a means for organizing the data content, preferably by subject-matter. The hierarchical data content structure includes a plurality of channels, and each channel is segmented into one or more content sub-channels. Each individual data content item is associated with at least one of the content sub-channels and corresponding channel. The individual data content item is associated with a particular channel according to the subject matter of the individual data content item and the subject-matter of the channel. In this manner, a content sub-channel with a specific subject-matter is configured and an individual data content item corresponding to the specific subject-matter is associated with the content sub-channel.

31 Claims, 3 Drawing Sheets

U.S. PATENT DOCUMENTS

| | | | |
|---|---|---|---|
| 6,564,263 B1 | 5/2003 | Bergman et al. | |
| 6,615,248 B1 | 9/2003 | Smith | 709/217 |
| 6,643,506 B1 | 11/2003 | Criss et al. | 455/419 |
| 6,643,684 B1 | 11/2003 | Malkin et al. | |
| 6,735,434 B2 | 5/2004 | Criss et al. | 455/418 |
| 6,754,717 B1 | 6/2004 | Day, III et al. | 709/248 |
| 6,892,230 B1 | 5/2005 | Gu et al. | 709/220 |
| 6,968,184 B2 | 11/2005 | Criss et al. | 455/418 |
| 6,990,498 B2 | 1/2006 | Fenton et al. | 707/102 |
| 7,016,966 B1 | 3/2006 | Saulpaugh et al. | 709/230 |
| 7,024,430 B1 | 4/2006 | Ingraham et al. | 707/201 |
| 7,043,477 B2 | 5/2006 | Mercer et al. | 707/7 |
| 7,062,515 B1 | 6/2006 | Thomas et al. | |
| 7,062,546 B1 * | 6/2006 | Kolar et al. | 709/220 |
| 7,117,253 B2 | 10/2006 | Nakayama et al. | 709/218 |
| 7,117,482 B2 | 10/2006 | Nguyen et al. | 717/122 |
| 7,136,934 B2 | 11/2006 | Carter et al. | |
| 7,376,386 B2 | 5/2008 | Phillips et al. | 455/3.01 |
| 7,404,142 B1 * | 7/2008 | Tischer | 715/247 |
| 7,478,047 B2 | 1/2009 | Loyall et al. | |
| 2001/0021994 A1 | 9/2001 | Nash | |
| 2001/0029178 A1 | 10/2001 | Criss et al. | |
| 2001/0042073 A1 | 11/2001 | Saether et al. | 707/203 |
| 2002/0013852 A1 | 1/2002 | Janik | 709/231 |
| 2002/0022453 A1 | 2/2002 | Balog et al. | |
| 2002/0038319 A1 * | 3/2002 | Yahagi | 707/513 |
| 2002/0046278 A1 | 4/2002 | Hays et al. | |
| 2002/0059583 A1 * | 5/2002 | Kim | 725/32 |
| 2002/0059624 A1 | 5/2002 | Machida et al. | |
| 2002/0073172 A1 | 6/2002 | Armstrong et al. | |
| 2002/0080169 A1 | 6/2002 | Diederiks | 345/744 |
| 2002/0120885 A1 | 8/2002 | Choi et al. | |
| 2002/0143819 A1 * | 10/2002 | Han et al. | 707/513 |
| 2002/0174180 A1 | 11/2002 | Brown et al. | 709/203 |
| 2002/0194309 A1 | 12/2002 | Carter et al. | 709/219 |
| 2002/0198962 A1 * | 12/2002 | Horn et al. | 709/218 |
| 2003/0041147 A1 * | 2/2003 | van den Oord et al. | 709/227 |
| 2003/0093488 A1 | 5/2003 | Yoshida et al. | 709/213 |
| 2003/0140068 A1 * | 7/2003 | Yeung | 707/204 |
| 2003/0163467 A1 | 8/2003 | Cazier | 707/7 |
| 2003/0167318 A1 | 9/2003 | Robbin et al. | |
| 2003/0212608 A1 * | 11/2003 | Cliff | 705/26 |
| 2004/0010467 A1 | 1/2004 | Hori et al. | 705/50 |
| 2004/0039834 A1 | 2/2004 | Saunders et al. | 709/231 |
| 2004/0073787 A1 | 4/2004 | Ban et al. | 713/159 |
| 2004/0073901 A1 | 4/2004 | Imamatsu | 717/170 |
| 2004/0088731 A1 | 5/2004 | Putterman et al. | |
| 2004/0098379 A1 | 5/2004 | Huang | |
| 2004/0103064 A1 | 5/2004 | Howard et al. | |
| 2004/0128327 A1 | 7/2004 | Shi et al. | 707/201 |
| 2004/0181790 A1 | 9/2004 | Herrick | 717/168 |
| 2004/0194279 A1 | 10/2004 | Roy | 29/464 |
| 2004/0205263 A1 | 10/2004 | Sivaraman et al. | 710/21 |
| 2005/0055686 A1 | 3/2005 | Buban et al. | 717/170 |
| 2005/0055687 A1 | 3/2005 | Mayer | |
| 2005/0066063 A1 | 3/2005 | Grigorovitch et al. | |
| 2005/0108754 A1 | 5/2005 | Carhart et al. | 725/47 |
| 2005/0267948 A1 | 12/2005 | McKinley et al. | 709/217 |
| 2005/0283797 A1 * | 12/2005 | Eldering et al. | 725/35 |
| 2006/0002340 A1 | 1/2006 | Criss et al. | |
| 2006/0155400 A1 | 7/2006 | Loomis | |
| 2007/0177571 A1 | 8/2007 | Caulfield et al. | 370/350 |

OTHER PUBLICATIONS

Awbrey, Alicia; Spektor, Reena, "Apple Unveils New iPods,", 5GB, 10GB and 20GB Versions for Mac & Windows, http://www.apple.com/pr/library/2002/jul/17ipod.html, Jul. 17, 2002, p. 1-3, Macworld Expo, New York.

Abdulmotaleb El-Saddik, Carsten Griwodz, and Ralf Steinmetz; Exploiting User Behaviour in Prefetching WWW Documents, pp. 302-311, Industrial Process and System Communications Dept. of Electrical Eng. & Information Technology Darnstadt University of Technology, Merckstr. 25 • Darnstadt • Germany; GMD IPSI German National Research Center for Information Technology Dolivostr. 151• D-64293 Darmstadt • Germany.

Michael Enhrmantraut, Theo Harder, Hartmut Wittig, Ralf Steinmetz, "The Personal Electronic Program Guide-Towards the Pre-selection of Individual TV Programs", 1996 ACM 0-89791-873- Aug. 11, 1996, pp. 243-250, CIKM 96, Rockville MD USA.

* cited by examiner

INFORMATION AND CONTENT EXCHANGE DOCUMENT TYPE DEFINITIONS TO SUPPORT CONTENT DISTRIBUTION

FIELD OF THE INVENTION

The present invention relates to the field of content distribution. More particularly, the present invention relates to the field of Information and Content Exchange (ICE) document type definitions (DTDs) to support content distribution.

BACKGROUND OF THE INVENTION

Reusing and redistributing information and content from one web site to another is an ad hoc and expensive process. The Information and Content Exchange (ICE) protocol was developed to manage and automate the establishment of syndication relationships, data transfer, and results analysis. When combined with an industry specific vocabulary, ICE provides a solution for syndicating any type of information between providers and their subscribers. The provider of content, or information, is referred to as a syndicator. The syndicator uses ICE to send information and content to the subscriber. The subscriber uses ICE to obtain information and content from the syndicator. A subscription is an agreement to deliver a package sequence from the syndicator to the subscriber. There may be many independent subscriptions between a syndicator and a subscriber.

ICE is an application of the Extensible Mark-up Language (XML). Basic concepts in ICE are represented using the element/attribute mark-up model of XML. The ICE protocol works in conjunction with XML document type definitions (DTDs). A DTD describes the contents of a document. The ICE protocol covers four general types of operations: subscription establishment and management, data delivery, event logs, and miscellaneous. From the ICE perspective, a relationship between a syndicator and a subscriber starts off with some form of subscription establishment. In ICE, the subscriber typically begins by obtaining a catalog of possible subscriptions (subscription offers) from the syndicator. The subscriber then subscribes to particular subscriptions, possibly engaging in protocol parameter negotiation to arrive at mutually agreeable delivery methods and schedules.

The relationship then moves on to the steady state, where the primary messages being exchanged center on data delivery. ICE uses a package concept as a container mechanism for generic data items. ICE defines a sequenced package model allowing a syndicator to support both incremental and full update models. ICE also defines push and pull data transfer models.

Managing exceptional conditions and being able to diagnose problems is an important part of syndication management. Accordingly, ICE defines a mechanism by which event logs can be automatically exchanged between the subscriber and the syndicator.

Finally, ICE provides a number of mechanisms for supporting miscellaneous operations, such as the ability to renegotiate protocol parameters in an established relationship, the ability to send unsolicited ad-hoc notifications (e.g., textual messages) between systems (presumably ultimately targeted at administrators), the ability to query and ascertain the state of the relationship, etc.

The ICE protocol is a request/reply protocol that allows for fully symmetric implementations, where both the syndicator and subscriber can initiate requests. The ICE protocol also allows for a minimal subscriber implementation where only the subscriber can initiate requests ICE uses payload exchange as its fundamental protocol model, where a payload is typically defined as a single instance of an XML document formatted according to the ICE protocol definition. Payloads can contain requests, responses or unsolicited messages. The unsolicited messages are used to support minimal subscriber implementations. A request is a message asking for the performance of an operation, and a payload is used to transmit the request. For example, when a subscriber wishes to initiate a relationship by obtaining a catalog from a syndicator, the subscriber sends the syndicator a payload containing a "get catalog" request. Similarly, a response is a message containing the results of an operation and a payload is also used to transmit responses.

SUMMARY OF THE INVENTION

The present invention includes extensions to a communications protocol to manage the exchange of data content and related metadata according to a hierarchical data content structure. Preferably, the communications protocol is the ICE protocol, and the extensions include ICE DTD extensions. Data content is preferably offered according to a subscription service provided by a first network device. The first network device is preferably a content server. The data content is organized, and thereby distributed, according to the hierarchical data content structure defined by the ICE DTD extensions. The hierarchical data content structure provides a means for organizing the data content, preferably by subject-matter. The hierarchical data content structure preferably includes a plurality of channels, and each channel is segmented into one or more content sub-channels. Each individual data content item is associated with at least one of the content sub-channels and corresponding channel. The individual data content item is associated with a particular channel, and content sub-channel, according to the subject matter of the individual data content item and the subject-matter of the channel, and content sub-channel. In this manner, a content sub-channel with a specific subject-matter is configured and an individual data content item corresponding to the specific subject-matter is associated with the content sub-channel.

In one aspect of the present invention, a network device includes one or more applications, a network layer coupled to interface with one or more other network devices, a communications layer to provide a communications protocol to manage data content exchange between the network device and the one or more other network devices, and an extension layer to provide document type definition extensions to the communications layer, wherein the document type definition extensions define a hierarchical data content structure for the data content and metadata corresponding to the hierarchical data content structure. The hierarchical data content structure can comprise a plurality of channels. Each channel within the plurality of channels can include one or more content sub-channels, wherein each channel provides data content of a related subject-matter and each content sub-channel within a given channel segments the data content within the given channel according to more specific subject-matter than the subject-matter of the given channel. The metadata can define attributes associated with each channel and content sub-channel within the hierarchical data content structure. A first data content is associated with a first channel and a first content sub-channel within the first channel. The first data content can be associated with the first channel and the first content sub-channel according to a subject-matter of the first data content, the specific subject-matter of the first channel and the more specific subject-matter of the first content sub-channel. The communications layer can comprise an Information and Content Exchange protocol. The Information and Content Exchange protocol includes document type definitions and the document type definition extensions provide extensions to the document type definitions of the Information and Content Exchange protocol. The document type definition extensions can be extensible markup language (XML)-based.

In yet another aspect of the present invention, a method provides data content between a first network device and one or more other network devices. The method includes providing a communications protocol to manage data content exchange between the first network device and the one or more other network devices, providing document type definition extensions to the communications protocol, wherein the document type definition extensions define a hierarchical data content structure for the data content and metadata corresponding to the hierarchical data content structure, and transmitting data content between the first network device and the one or more other network devices according to the communication protocol and the document type definition extensions to the communications protocol. The method can include configuring the hierarchical data content structure into a plurality of channels. The method can include configuring each channel within the plurality of channels into one or more content sub-channels, wherein each channel provides data content of a related subject-matter and each content sub-channel within a given channel segments the data content within the given channel according to more specific subject-matter than the subject-matter of the given channel. The metadata can define attributes associated with each channel and content sub-channel within the hierarchical data content structure. The method can include associating a first data content with a first channel and a first content sub-channel within the first channel. The first data content is associated with the first channel and the first content sub-channel according to a subject-matter of the first data content, the specific subject-matter of the first channel and the more specific subject-matter of the first content sub-channel. The communications protocol can comprise an Information and Content Exchange protocol. The Information and Content Exchange protocol includes document type definitions and the document type definition extensions provide extensions to the document type definitions of the Information and Content Exchange protocol. The document type definition extensions are extensible markup language (XML)-based.

In yet another aspect of the present invention, a network includes one or more network devices, and a first network device coupled to the one or more other network device. The first network device includes one or more applications, a network layer coupled to interface with the one or more other network devices, a communications layer to provide a communications protocol to manage data content exchange between the first network device and the one or more other network devices, and an extension layer to provide document type definition extensions to the communications layer, wherein the document type definition extensions define a hierarchical data content structure for the data content and metadata corresponding to the hierarchical data content structure. The hierarchical data content structure can comprise a plurality of channels. Each channel within the plurality of channels can include one or more content sub-channels, wherein each channel provides data content of a related subject-matter and each content sub-channel within a given channel segments the data content within the given channel according to more specific subject-matter than the subject-matter of the given channel. The metadata can define attributes associated with each channel and content sub-channel within the hierarchical data content structure. A first data content is associated with a first channel and a first content sub-channel within the first channel. The first data content can be associated with the first channel and the first content sub-channel according to a subject-matter of the first data content, the specific subject-matter of the first channel and the more specific subject-matter of the first content sub-channel. The communications layer can comprise an Information and Content Exchange protocol. The Information and Content Exchange protocol includes document type definitions and the document type definition extensions provide extensions to the document type definitions of the Information and Content Exchange protocol. The document type definition extensions can be extensible markup language (XML)-based.

In still yet another aspect of the present invention, a network device includes one or more applications, a network layer coupled to interface with one or more other network devices, an Information and Content Exchange protocol including document type definitions to manage data content exchange between the network device and the one or more other network devices, and extensions to the document type definitions extensions, wherein the document type definition extensions define a hierarchical data content structure for the data content and metadata corresponding to the hierarchical data content structure. The hierarchical data content structure can comprise a plurality of channels. Each channel within the plurality of channels can include one or more content sub-channels, wherein each channel provides data content of a related subject-matter and each content sub-channel within a given channel segments the data content within the given channel according to more specific subject-matter than the subject-matter of the given channel. The metadata can define attributes associated with each channel and content sub-channel within the hierarchical data content structure. A first data content is associated with a first channel and a first content sub-channel within the first channel. The first data content can be associated with the first channel and the first content sub-channel according to a subject-matter of the first data content, the specific subject-matter of the first channel and the more specific subject-matter of the first content sub-channel. The document type definition extensions can be extensible markup language (XML)-based.

DETAILED DESCRIPTION OF THE EMBODIMENTS

Embodiments of the present invention include extensions to a communications protocol to manage the exchange of data content and related metadata according to a hierarchical data content structure. Preferably, the communications protocol is the ICE protocol, and the extensions include ICE DTD extensions.

Data content is preferably offered according to a subscription service provided by a first network device. The first network device is preferably a content server. The data content is organized, and thereby distributed, according to a hierarchical data content structure defined by the ICE DTD extensions. The hierarchical data content structure provides a means for organizing the data content, preferably by subject-matter. The hierarchical data content structure preferably includes a plurality of channels, and each individual data content item is associated with at least one of the channels. The individual data content item is associated with a particular channel according to the subject matter of the individual data content item and the subject-matter of the channel. Each channel is preferably segmented into one or more content sub-channels. Each content sub-channel preferably defines a more specific subject-matter than the subject-matter of its associated channel. Each individual data item associated with the channel is also associated with one or more of the content sub-channels within the channel. In this manner, a content sub-channel with a specific subject-matter is configured and an individual data content item corresponding to the specific subject-matter is associated with the content sub-channel. Additionally, metadata is defined and associated with each channel, content sub-channel, and individual data content item. The metadata includes attributes of each channel, content sub-channel, and individual data content item.

The content server and a subscribing network device, a subscriber, include the communication protocol and the extensions to the communications protocol that define the hierarchical data content structure and any related metadata. Preferably, the subscriber has established a subscription with the content server. When the subscribing network device requests a particular data content item from the content server, the requested data content item is distributed to the subscribing network device according to the subscription. The subscription preferably defines which channels, or content sub-channels, that the subscribing network device is enabled to receive data content from. In this manner, data content categorized by subject-matter can be selectively offered and distributed to subscribers. The term "content" as used herein preferably refers to data of any data type, including but not limited to audio, video, graphics, text, and any combination thereof.

Figure 1:
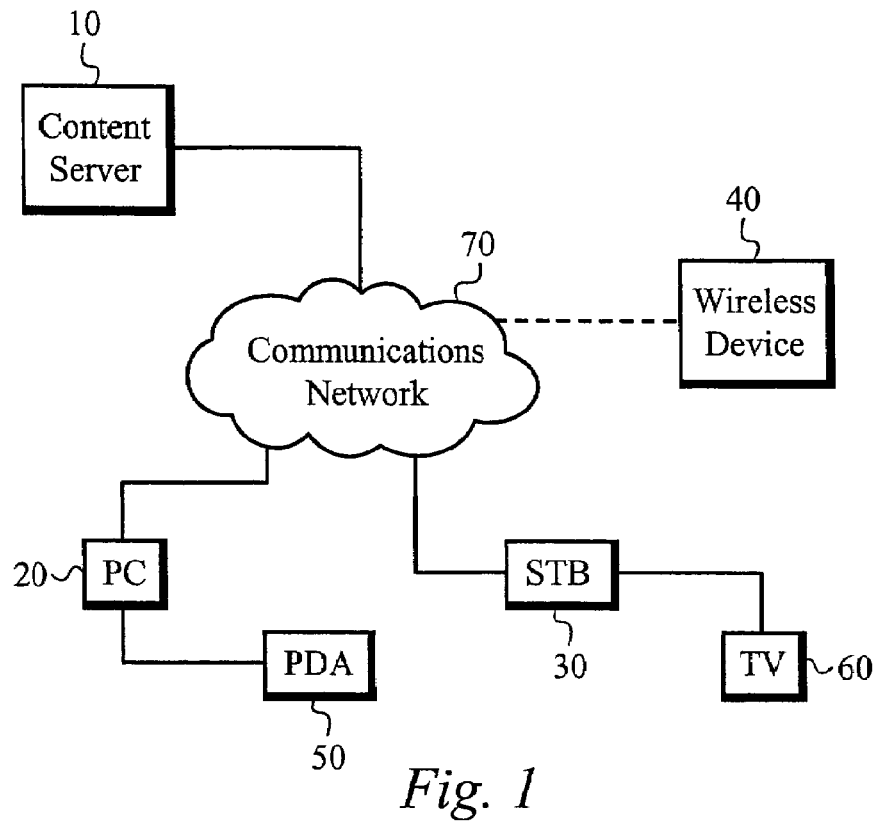
FIG. 1 illustrates an exemplary network of devices.

FIG. 1 illustrates an exemplary network of devices including a content server 10, a personal computer (PC) 20, a set-top box (STB) 30, a wireless device 40, a personal digital assistant (PDA) 50, and a television (TV) 60. The content server 10, the PC 20, the STB 30, and the wireless device 40 are coupled to each other via a communications network 70. The communications network 70 can be of any conventional type, or a combination thereof. Preferably, the communications network 70 is the Internet. The PDA 50 is coupled to the PC 20 via any conventional networking means. The TV 60 is coupled to the STB 30 via any conventional networking means. The wireless device 40 is preferably coupled to the communication network 70 via a wireless connection, although any conventional networking means can be used. It should be clear to those skilled in the art that more or less network devices can be included in the exemplary network of devices illustrated in FIG. 1.

The content server 10 preferably offers data content associated with a data content distribution service that provides data content to subscribers. The content server 10 provides data content to any network device subscribing to the data content distribution service. In the preferred embodiment of the present invention, each network device subscribing to the data content distribution service includes the communications layer and the extension layer of the present invention. The content server 10 also includes the communications layer and the extensions layer. Preferably, all of the network devices illustrated in FIG. 1, including the PC 20, the STB 30, the wireless device 40, the PDA 50, and the TV 60, include the communications layer and the extensions layer according to the present invention.

The data content provided by the data content distribution service is organized and offered according to an hierarchical data content structure. The hierarchical data content structure includes a plurality of channels where each channel provides data content of a related subject-matter. Each channel is preferably segmented into one or more content sub-channels where each sub-channel further segments the data content into more specific subject-matter. Preferably, the communication layer is an Information Content and Exchange (ICE) protocol which includes ICE document type definitions (DTDs). ICE manages data content exchange between a subscriber and a syndicator. The extension layer preferably includes extensions to the ICE DTDs. The syndicator is preferably the content server 10. The subscriber preferably uses ICE and the ICE DTD extensions to obtain information and content from the syndicator. The syndicator preferably uses ICE and the ICE DTD extensions to send information and the data content according to the hierarchical data content structure. The information sent by the syndicator and obtained by the subscriber according to ICE and the ICE DTD extensions includes communication messages and metadata. The metadata includes information related to the channels and content sub-channels defined by the hierarchical data content structure, and the data content organized according to the hierarchical data content structure.

Figure 2:
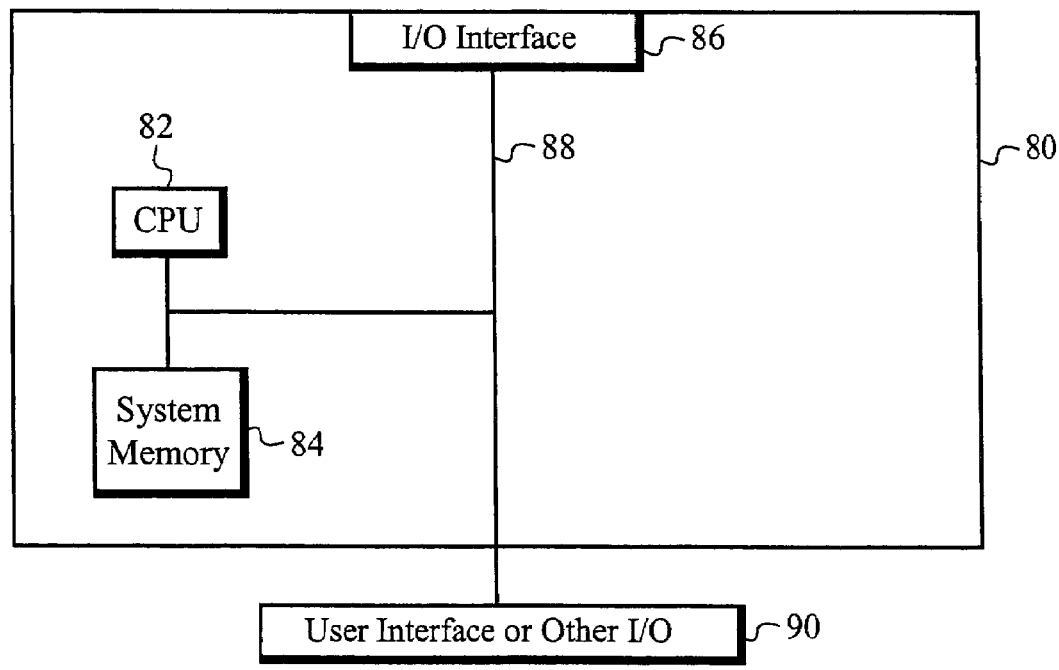
FIG. 2 illustrates a block diagram of an exemplary hardware system resident in each network device implementing the extension layer of the present invention.

A block diagram of an exemplary hardware system resident in each network device implementing the extension layer of the present invention is illustrated in FIG. 2. In the hardware system illustrated in FIG. 2, a printed circuit board 80 is coupled to a user interface 90. The printed circuit board 80 includes a central processing unit (CPU) 82 coupled to system memory 84 and to an I/O bus interface 86 by a system bus 88. The user interface 90 is also coupled to the system bus 88. The user interface 90 is network device specific, but can include a keyboard, display or other I/O devices for communicating with a user of the network device. It should be apparent to those skilled in the art that there may be some devices implementing the interface layer of the present invention which do not include the user interface 90, such as a hard disk drive or similar device.

Each network device intending to implement the extension layer of the present invention will preferably include a hardware system such as the system illustrated in FIG. 2. Each network device intending to implement the extension layer will preferably include the communication layer to which the extension layer is an extension. As applied to the network of devices illustrated in FIG. 1, the content server 10, the PC 20, the STB 30, the wireless device 40, the PDA 50, and the TV 60, each preferably includes the hardware system of FIG. 2. The CPU 82 within the network device is used to execute the appropriate program instructions. The communication layer and the extension layer of the present invention will then enable the data content distribution according to the hierarchical data content structure, including the corresponding metadata, between the content server 10 and any subscribing network device.

Figure 3:
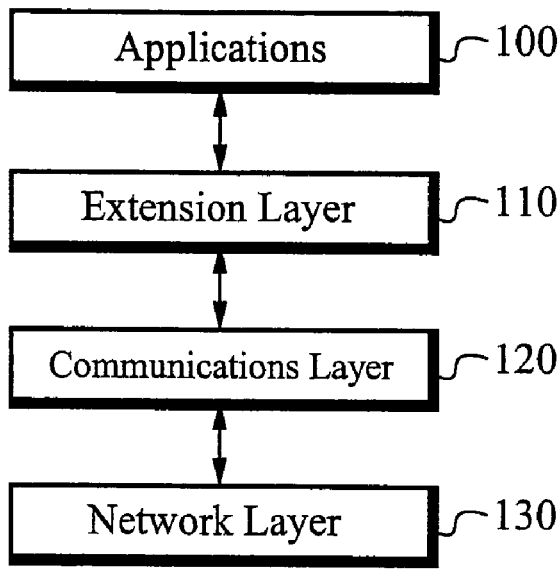
FIG. 3 illustrates a protocol according to the present invention.

A protocol according to the present invention is illustrated in FIG. 3. An extension layer 110 is coupled to one or more applications 100 and a communications layer 120. The applications 100 preferably include one or more data content distribution applications which enable the exchange of data content between two network devices. Preferably, the data content exchange is performed according to a subscription service offered by the syndicator, for example the content server 10 in FIG. 1, and subscribed to by the subscriber, for example the PC 20 in FIG. 1. The communications layer 120 preferably provides a communications protocol to manage the exchange of data content between the content server 10 and the PC 20. The extension layer 110 preferably provides extensions to the communications layer 120 to define the hierarchical data content structure for the data content and the metadata corresponding to the hierarchical data content structure. The one or more data content distribution applications 100 preferably provide data content according to the hierarchical data content structure.

The communications layer 120 is also coupled to a network layer 130 for generating necessary communications with another network device involved in the data content exchange. The network layer 130 represents a supported protocol stack used in the data content exchange process. The applications 100, the extension layer 110, the communications layer 120, and the network layer 130 are preferably resident within each network device implementing the communication protocol extensions of the present invention. The communications layer 120 communicates with the applications 100 via the extension layer 110 and the network layer 130 as necessary to provide communications to and from the applications 100.

Figure 4:
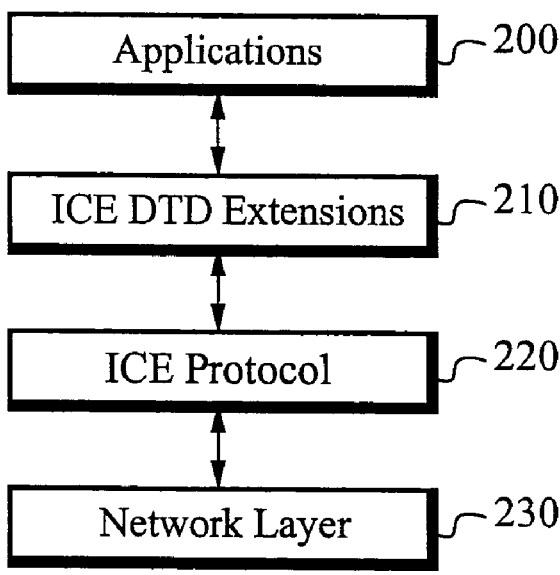
FIG. 4 illustrates a preferred protocol according to the present invention.

FIG. 4 illustrates a preferred protocol according to the present invention. The preferred protocol includes one or more applications 200, an ICE DTD extensions 210, an ICE protocol 220, and a network layer 230. The applications 200 preferably include one or more data content distribution applications which enable the exchange of data content between two network devices. The ICE protocol 220 preferably provides the communications protocol to manage the exchange of data content between two network devices for example between the content server 10 and the PC 20. The ICE DTD extensions 210 preferably provide extensions to the DTDs within the ICE protocol 220 to define the hierarchical data content structure for the data content and the metadata corresponding to the hierarchical data content structure. The one or more data content distribution applications 200 preferably provide data content according to the hierarchical data content structure. The ICE protocol 220 is also coupled to the network layer 230 for generating necessary communications with another network device involved in the data content exchange. The network layer 230 represents a supported protocol stack used in the data content exchange process.

Figure 5:
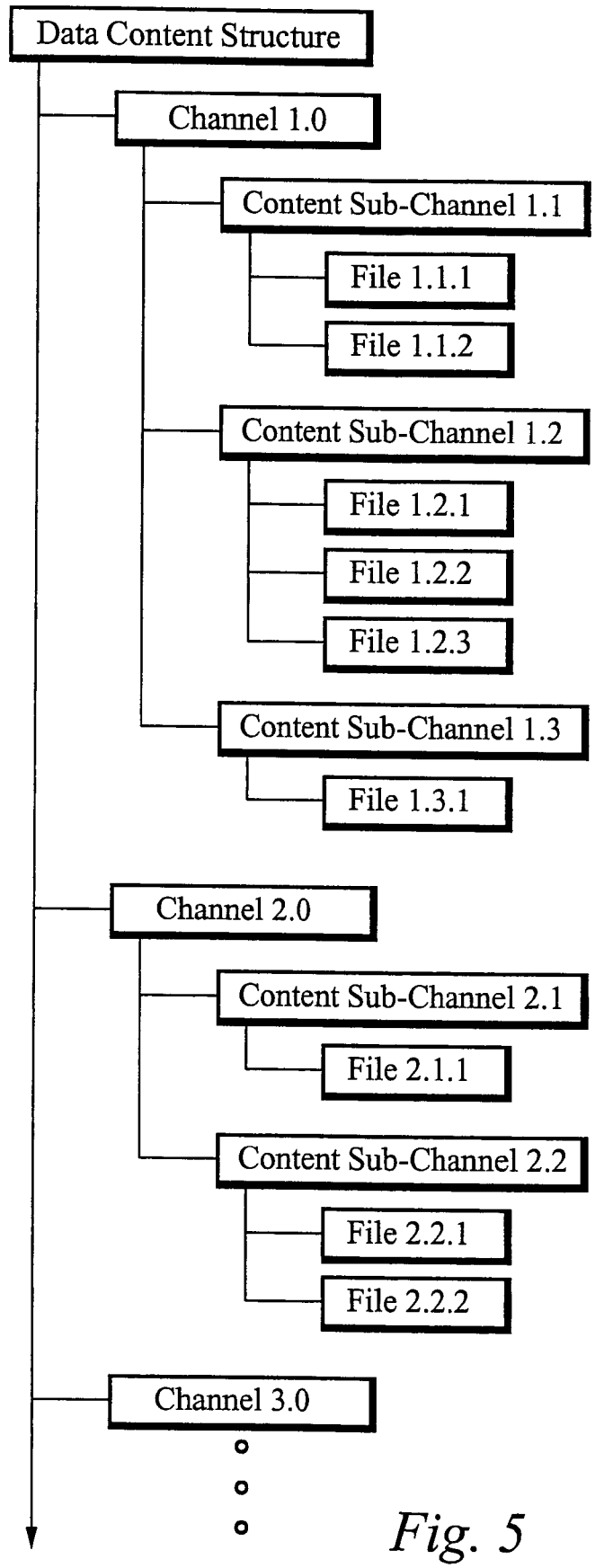
FIG. 5 illustrates a preferred hierarchical data content structure according to the present invention.

FIG. 5 illustrates a preferred hierarchical data content structure according to the present invention. As described above, the data content available via the data content distribution service is organized according to the hierarchical data content structure. The hierarchical data content structure is preferably configured as a plurality of channels, each channel including one or more content sub-channels. Individual data content items, for example a movie, are associated with at least one content sub-channel, preferably according to related subject-matter. In FIG. 5, the hierarchical data content structure includes Channel 1.0, Channel 2.0, and Channel 3.0. It should be clear to those skilled in the art that the hierarchical data content structure can include more or less channels than illustrated in FIG. 5. Channel 1.0 includes Content Sub-Channel 1.1, Content Sub-Channel 1.2, and Content Sub-Channel 1.3. Content Sub-Channel 1.1 includes individual data content items File 1.1.1 and File 1.1.2. Content Sub-channel 1.2 includes individual data content items File 1.2.1, File 1.2.2, and File 1.2.3. Content Sub-channel 1.3 includes individual data content item File 1.3.1. Channel 2.0 includes Content Sub-Channel 2.1 and Content Sub-Channel 2.2. Content Sub-Channel 2.1 includes individual data content item File 2.1.1. Content Sub-Channel 2.2 includes individual data content items File 2.2.1 and File 2.2.2. It should be clear to those skilled in the art that the number of content sub-channels included within each channel, and the number of individual data content items included within each content sub-channel illustrated in FIG. 5 is for illustrative purposes only and that the number of content sub-channels and individual data items can vary according to the specific application. It should also be clear that the hierarchical data content structure can include more levels, for example content sub-channels of a content sub-channel.

Preferably, each channel includes data content related to a specific subject-matter, and each content sub-channel segments the channel according to more specific subject matter. For example, Channel 1.0 may include subject matter related to motion pictures, and Content Sub-Channel 1.1 may include subject-matter related to movies, and Content Sub-Channel 1.2 may include subject-matter related to televison shows.

The extension layer of the present invention also provides metadata associated with each channel, each content sub-channel, and each individual data content item. The metadata associated with each channel preferably includes a title, a caption, an icon-url, an ice-element, and an item-group-id. The metadata associated with each content sub-channel preferably includes a title, a caption, a priority, an icon-url, an ice-element, and an item-group-id. Each individual data content item preferably includes an individual file. The metadata associated with each file preferably includes a url, a main, a size, an ice-element, and an item-id. It should be clear to those skilled in the art that other metadata can be included for each channel, content sub-channel, and individual data content item.

When a user wants to receive content, the user requests content from the content server using a subscription ID. In return, the content server sends an ICE package to the user. In the preferred embodiment, the ICE package includes a URL that directs the user to the location of the requested content. The ICE package includes the ICE DTD extensions of the present invention.

Table 1 illustrates an exemplary ICE DTD extension in which a new element is added. Each new element is extended from the domain specific content, thereby expanding the content domain of the ICE protocol. The new element is preferably referred to as scp-channel, as shown below in Table 1.

TABLE 1

```
<!ENTITY % cm.content "ice-item-group / ice-item / ice-item-ref /
scp-channel" >
<!ELEMENT scp-channel    (scp-content) +)>
<!ATTLIST scp-channel    %attlist .item
    title             CDATA      #IMPLIED
    caption           CDATA      #IMPLIED
    icon-url          CDATA      #IMPLIED
    ice-element       CDATA      #FIXED 'ice-item-group'
    item-group-id     CDATA      #REQUIRED
>
<!ELEMENT scp-content    (scp-file-ref) +)>
<!ATTLIST scp-content    %attlist . item
    title             CDATA      #IMPLIED
    caption           CDATA      #IMPLIED
    priority          CDATA      #IMPLIED
    icon-url          CDATA      #IMPLIED
    ice-element       CDATA      #FIXED 'ice-item-group'
    item-group-id     CDATA      #REQUIRED
>
<!ELEMENT scp-file-ref   EMPTY>
<!ATTLIST scp-file-ref   %attlist item
```

TABLE 1-continued

| | | |
|---|---|---|
| url | CDATA | #REQUIRED |
| main | CDATA | #REQUIRED |
| size | CDATA | #REQUIRED |
| ice-element | CDATA | #FIXED 'ice-item-ref' |
| item-id | CDATA | #REQUIRED |
| > | | |
| <!ENTITY % attlist . item | | |
| activation | CDATA | #IMPLIED |
| expiration | CDATA | #IMPLIED |
| content-filename | CDATA | #IMPLIED |
| content-transfer-encoding | (base64 / | x-native-xml) |
| | | 'x-native-xml' |
| content-type | CDATA | application/octet-stream |
| ip-status | CDATA | #IMPLIED |
| xml: lang | CDATA | #IMPLIED |
| license | CDATA | #IMPLIED |
| rights-holder | CDATA | #IMPLIED |
| show-credit | CDATA | #IMPLIED |
| subscription-element | CDATA | #IMPLIED |
| > | | |

Another exemplary ICE package written in XML is illustrated below in Table 2. In the preferred embodiment, the contents of the ICE package are URLs.

TABLE 2

```
<?xml version="1.0"?>
<ice-payload ice.version="1.1" timestamp="2003-06-12T14.15.33,813"
payload-id="PL-O11 ">
    <ice-header>
        <ice-sender role="subscriber"
        sender-id="4dd2cc35-6dbd- 4856-8911-
a006182b2008"
location=="http://43.134 .85.136:8O8O/twice/subscriber/listener.jsp"
name="Brads Gadgets, Inc."/>
    </ice-header>
    <ice-response response-id="RP-O22">
        <ice-code
            numeric="200"
            phrase="OK"/>
        <ice-package
            old-state="ICE-ANY"
            package-id="PK-014"
            new-state="ICE-ANY"
            subscription-id="SB-08">
        <scp-channel
            ice-element='ice-item-group'
            item-group-id="channel id"
            subscription-element="unique # for this channel"
            title="Title"
            caption="Description"
            icon-url="http://www.sonychannel.com/i1.jpg">
        <scp-content
            ice-element='ice-item-group'
            item-group-id="content id"
            subscription-element="unique # for this content"
            Title="Title"
            caption="Description"
            priority="1">
            icon-url="htttp://www.sonychannel.com/i2.jpg">
        <scp-file-ref
    url="http://www.sonychannel.com/test/index.html"
            ice-element='ice-item-ref'
            content -
            filename="/test/index.html"
            content-type="text/html"
            subscription-element="unique# for this file"
            item-ref-id="file Id"
            size="file size"
            main="true"/>
        <scp-file-ref
    url="http://www.sonychannel.com/test/test.jpg"
            ice-element='ice-item-ref'
            content-filename="/test/test.jpg"
            content-type="image/test.jpg"
            subscription-element="unique# for this file"
```

TABLE 2-continued

```
            item-ref-id="file Id"
            size = "file size"
            main="false "/>
        </scp-content>
        </scp-channel>
        <ice-item-remove subscription-element="unique" />
    </ice-package>
    <ice-response>
</ice-payload>
```

In operation, a first network device includes data content for distribution to one or more other network devices. The data content is preferably offered according to a subscription service provided by the first network device. The data content is organized, and thereby distributed, according to a hierarchical data content structure. The hierarchical data content structure provides a means for organizing the data content, preferably by subject-matter. The hierarchical data content structure preferably includes a plurality of channels, and each individual data content item offered by the first network device is associated with at least one of the channels. The individual data content item is associated with a particular channel according to the subject matter of the individual data content item and the subject-matter of the channel. Each channel is preferably segmented into one or more content sub-channels. Each content sub-channel preferably defines a more specific subject-matter than the subject-matter of its associated channel. Each individual data item associated with the channel is also associated with one or more of the content sub-channels within the channel. In this manner, a content sub-channel with a specific subject-matter is configured and an individual data content item corresponding to the specific subject-matter is associated with the content sub-channel. Additionally, metadata is defined and associated with each channel, content sub-channel, and individual data content item. The metadata includes attributes of each channel, content sub-channel, and individual data content item.

The first network device includes a communication protocol to manage the data content exchange with one or more of the network devices. The first network device also includes an extensions layer that provides document type extensions to the communication protocol that define the hierarchical data content structure and any related metadata. The communication protocol is preferably the Information and Content Exchange (ICE) protocol which includes document type definitions (DTDs). The extensions layer preferably includes ICE DTD extensions. When a second network device requests a particular data content item from the first network device, the requested data content item is distributed to the second network device according to a subscription entered into by the second network device. The subscription is part of the subscription service provided by the first network device. The subscription preferably defines which channels, or content sub-channels, that the second network device is enabled to receive data content from. In this manner, data content is categorized by subject-matter and is selectively offered and distributed to subscribers.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A network device coupled to a network of devices, the network device comprising a hardware system configured to implement:
   a. one or more applications;
   b. a network layer coupled to interface with one or more other network devices;
   c. a communications layer to provide a communications protocol including document type definitions to manage data content exchange between the network device and the one or more other network devices; and
   d. an extension layer to provide document type definition extensions to the document type definitions, wherein the document type definition extensions define a hierarchical data content structure for data content and metadata corresponding to the hierarchical data content structure, further wherein the hierarchical data content structure comprises a plurality of channels to store the data content, wherein the data content is selectively offered and distributed, wherein each channel within the plurality of channels includes one or more content sub-channels, each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes associated with the each channel within the plurality of channels and the content sub-channel of the one or more content sub-channels within the hierarchical data content structure, and further wherein the metadata associated with each channel of the plurality of channels includes a title, a caption, an icon-url, an ice-element and an item-group-id.

2. The network device of claim 1 wherein a first data content is associated with a first channel and a first content sub-channel within the first channel.

3. The network device of claim 2 wherein the first data content is associated with the first channel and the first content sub-channel according to a subject-matter of the first data content, specific subject-matter of the first channel and more specific subject-matter of the first content sub-channel.

4. The network device of claim 1 wherein the communications layer comprises an Information and Content Exchange protocol.

5. The network device of claim 4 wherein the Information and Content Exchange protocol includes document type definitions and the document type definition extensions provide extensions to the document type definitions of the Information and Content Exchange protocol.

6. The network device of claim 5 wherein the document type definition extensions are extensible markup language (XML)-based.

7. A method of providing data content between a first network device and one or more other network devices, the method comprising:
   a. providing a communications protocol including document type definitions to manage data content exchange between the first network device and the one or more other network devices;
   b. providing document type definition extensions to the document type definitions, wherein the document type definition extensions define a hierarchical data content structure for data content and metadata corresponding to the hierarchical data content structure;
   c. configuring the hierarchical data content structure into a plurality of channels to store the data content, wherein the data content is selectively offered and distributed;
   d. transmitting the data content between the first network device and the one or more other network devices according to the communication protocol and the document type definition extensions to the communications protocol; and
   e. configuring each channel within the plurality of channels into one or more content sub-channels, wherein each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes associated with the each channel within the plurality of channels and the content sub-channel of the one or more content sub-channels within the hierarchical data content structure and further wherein the metadata associated with each channel of the plurality of channels includes a title, a caption, an icon-url, an ice-element and an item-group-id.

8. The method of claim 7 further comprising associating a first data content with a first channel and a first content sub-channel within the first channel.

9. The method of claim 8 wherein the first data content is associated with the first channel and the first content sub-channel according to a subject-matter of the first data content, specific subject-matter of the first channel and more specific subject-matter of the first content sub-channel.

10. The method of claim 7 wherein the communications protocol comprises an Information and Content Exchange protocol.

11. The method of claim 7 wherein the Information and Content Exchange protocol includes document type definitions and the document type definition extensions provide extensions to the document type definitions of the Information and Content Exchange protocol.

12. The method of claim 11 wherein the document type definition extensions are extensible markup language (XML)-based.

13. An apparatus for providing data content between a first network device and one or more other network devices, the apparatus comprising a hardware system configured to implement:
   a. means for providing a communications protocol including document type definitions to manage data content exchange between the first network device and the one or more other network devices
   b. means for providing document type definition extensions to the document type definitions, wherein the document type definition extensions define a hierarchical data content structure for data content and metadata corresponding to the hierarchical data content structure;
   c. means for configuring the hierarchical data content structure into a plurality of channels to store the data content, wherein the data content is selectively offered and distributed;
   d. means for transmitting the data content between the first network device and the one or more other network devices according to the communication protocol and the document type definition extensions to the communications protocol; and
   e. means for configuring each channel within the plurality of channels into one or more content sub-channels, wherein each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes associated with the each channel within the plurality of channels and the content sub-channel of the one or more content sub-channels within the hierarchical data content structure and further wherein the metadata associated with each channel of the plurality of channels includes a title, a caption, an icon-url, an ice-element and an item-group-id.

14. The apparatus of claim 13 wherein the hardware system is further configured to implement means for associating a first data content with a first channel and a first content sub-channel within the first channel.

15. The apparatus of claim 14 wherein the first data content is associated with the first channel and the first content sub-channel according to a subject-matter of the first data content, specific subject-matter of the first channel and more specific subject-matter of the first content sub-channel.

16. The apparatus of claim 13 wherein the communications protocol comprises an Information and Content Exchange protocol.

17. The apparatus of claim 13 wherein the Information and Content Exchange protocol includes document type definitions and the document type definition extensions provide extensions to the document type definitions of the Information and Content Exchange protocol.

18. The apparatus of claim 17 wherein the document type definition extensions are extensible markup language (XML)-based.

19. A network comprising:
  a. one or more network devices; and
  b. a first network device coupled to the one or more other network devices, the first network device comprising:
    i. one or more applications;
    ii. a network layer coupled to interface with the one or more other network devices;
    iii. a communications layer to provide a communications protocol including document type definitions to manage data content exchange between the first network device and the one or more other network devices; and
    iv. an extension layer to provide document type definition extensions to the document type definitions, wherein the document type definition extensions define a hierarchical data content structure for data content and metadata corresponding to the hierarchical data content structure, further wherein the hierarchical data content structure comprises a plurality of channels to store the data content, wherein the data content is selectively offered and distributed, each channel within the plurality of channels includes one or more content sub-channels, wherein each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes associated with the each channel within the plurality of channels and the content sub-channel of the one or more content sub-channels within the hierarchical data content structure and further wherein the metadata associated with each channel of the plurality of channels includes a title, a caption, an icon-url, an ice-element and an item-group-id.

20. The network of devices of claim 19 wherein a first data content is associated with a first channel and a first content sub-channel within the first channel.

21. The network of devices of claim 20 wherein the first data content is associated with the first channel and the first content sub-channel according to a subject-matter of the first data content, specific subject-matter of the first channel and more specific subject-matter of the first content sub-channel.

22. The network of devices of claim 19 wherein the communications layer comprises an Information and Content Exchange protocol.

23. The network of devices of claim 19 wherein the Information and Content Exchange protocol includes document type definitions and the document type definition extensions provide extensions to the document type definitions of the Information and Content Exchange protocol.

24. The network of devices of claim 23 wherein the document type definition extensions are extensible markup language (XML)-based.

25. A network device coupled to a network of devices, the network device comprising a hardware system configured to implement:
  a. one or more applications;
  b. a network layer coupled to interface with one or more other network devices;
  c. an Information and Content Exchange protocol including document type definitions to manage data content exchange between the network device and the one or more other network devices; and
  d. extensions to the document type definitions, wherein document type definitions extensions define a hierarchical data content structure for data content and metadata corresponding to the hierarchical data content structure, further wherein the hierarchical data content structure comprises a plurality of channels to store the data content, wherein the data content is selectively offered and distributed, each channel within the plurality of channels includes one or more content sub-channels, wherein each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes associated with the each channel within the plurality of channels and the content sub-channel of the one or more content sub-channels within the hierarchical data content structure, and further wherein the metadata associated with each channel of the plurality of channels includes a title, a caption, an icon-url, an ice-element and an item-group-id.

26. The network device of claim 25 wherein a first data content is associated with a first channel and a first content sub-channel within the first channel.

27. The network device of claim 26 wherein the first data content is associated with the first channel and the first content sub-channel according to a subject-matter of the first data content, specific subject-matter of the first channel and more specific subject-matter of the first content sub-channel.

28. The network device of claim 25 wherein the document type definition extensions are extensible markup language (XML)-based.

29. A network device coupled to a network of devices, the network device comprising a hardware system configured to implement:
   a. one or more applications;
   b. a network layer coupled to interface with one or more other network devices;
   c. a communications layer to provide a communications protocol including document type definitions to manage data content exchange between the network device and the one or more other network devices; and
   d. an extension layer to provide document type definition extensions to the document type definitions, wherein the document type definition extensions define a hierarchical data content structure for data content and metadata corresponding to the hierarchical data content structure, further wherein the hierarchical data content structure comprises a plurality of channels to store the data content, wherein the data content is selectively offered and distributed, wherein each channel within the plurality of channels includes one or more content sub-channels, wherein each channel within the plurality of channels provides data content of a related subject-matter and each content sub-channel of the one or more content sub-channels within a given channel segments the data content within the given channel according to more specific subject-matter than subject-matter of the given channel, wherein the metadata defines attributes of each of the plurality of channels, each of the sub-channels and each of the data content and further wherein the metadata associated with each channel of the plurality of channels includes a title, a caption, an icon-url, an ice-element and an item-group-id.

30. The network device of claim 29 wherein the metadata associated with each content sub-channel includes a title, a caption, a priority, an icon-url, an ice-element and an item-group-id.

31. The network device of claim 29 wherein the metadata associated with each data content includes a url, a size, an ice-element and an item-id.

* * * * *